(12) United States Patent
Smith et al.

(10) Patent No.: US 10,484,378 B2
(45) Date of Patent: Nov. 19, 2019

(54) MECHANISM FOR FACILITATING DYNAMIC CONTEXT-BASED ACCESS CONTROL OF RESOURCES

(71) Applicant: INTEL CORPORATION, Santa Clara, CA (US)

(72) Inventors: Ned M. Smith, Beaverton, OR (US); Conor P. Cahill, Waterford, VA (US); Jason Martin, Beaverton, OR (US); Abhilasha Bhargav-Spantzel, El Dorado Hills, CA (US); Sanjay Bakshi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/098,524

(22) Filed: Apr. 14, 2016

(65) Prior Publication Data

US 2017/0012983 A1    Jan. 12, 2017

Related U.S. Application Data

(63) Continuation of application No. 14/129,961, filed as application No. PCT/US2013/062435 on Sep. 27, 2013, now abandoned.

(51) Int. Cl.
  *H04L 29/06*  (2006.01)
  *G06F 21/45*  (2013.01)
  *G06F 21/62*  (2013.01)

(52) U.S. Cl.
  CPC .............. *H04L 63/10* (2013.01); *G06F 21/45* (2013.01); *G06F 21/6218* (2013.01);
  (Continued)

(58) Field of Classification Search
  CPC ...... H04L 63/10; H04L 63/20; H04L 63/0876; G06F 21/45; G06F 21/6218; G06F 2221/2111
  (Continued)

(56) References Cited

U.S. PATENT DOCUMENTS

2007/0061243 A1  3/2007 Ramer
2007/0198849 A1  8/2007 Mozer
  (Continued)

OTHER PUBLICATIONS

PCT/US2013/062435, "Notification of Transmittal of the International Search Report and the Written Opinion of the International Searching Authority, or the Declaration" dated Jun. 23, 2014, pp. 14.
  (Continued)

*Primary Examiner* — Ashokkumar B Patel
*Assistant Examiner* — William B Jones
(74) *Attorney, Agent, or Firm* — Womble Bond Dickinson (US) LLP (57) ABSTRACT

A mechanism is described for facilitating context-based access control of resources for according to one embodiment. A method of embodiments, as described herein, includes receiving a first request to access a resource of a plurality of resources. The first request may be associated with one or more contexts corresponding to a user placing the first request at a computing device. The method may further include evaluating the one or more contexts. The evaluation of the one or more contexts may include matching the one or more contexts with one or more access policies associated with the requested resource. The method may further include accepting the first request if the one or more contexts satisfy at least one of the access policies.

14 Claims, 6 Drawing Sheets

(52) U.S. Cl.
CPC .......... *H04L 63/0876* (2013.01); *H04L 63/20* (2013.01); *G06F 2221/2111* (2013.01)

(58) Field of Classification Search
USPC .................................................. 100/1; 726/1
See application file for complete search history.

(56) References Cited

U.S. PATENT DOCUMENTS

| | | | |
|---|---|---|---|
| 2008/0077971 A1* | 3/2008 | Wright | G06F 21/32 726/1 |
| 2008/0222694 A1* | 9/2008 | Nakae | H04L 63/20 726/1 |
| 2010/0077457 A1* | 3/2010 | Xu | H04L 63/105 726/4 |
| 2011/0136503 A1* | 6/2011 | Sridhara | H04H 60/49 455/456.1 |
| 2011/0167479 A1* | 7/2011 | Maes | G06F 21/6281 726/4 |
| 2012/0036554 A1 | 2/2012 | Golan et al. | |
| 2013/0007861 A1 | 1/2013 | Sacena et al. | |
| 2013/0104187 A1 | 4/2013 | Weidner | |
| 2014/0075496 A1* | 3/2014 | Prakash | G06F 21/6218 726/1 |

OTHER PUBLICATIONS

Extended European Search Report for European Patent Application No. 13894105.9 dated Mar. 23, 2017, 8 pages.

PCT International Preliminary Report on Patentability for PCT Application No. PCT/US2013/062435 dated Mar. 29, 2016, 10 pages.

Chinese Office Action dated Jul. 18, 2018 for Chinese Application No. 201380079188.7, 13 pages. (Best Available Copy).

Chinese Office Action dated Dec. 1, 2017 for Chinese Application No. 201380079188.7, 13 pages. (Best Available Copy).

* cited by examiner

MECHANISM FOR FACILITATING DYNAMIC CONTEXT-BASED ACCESS CONTROL OF RESOURCES

CROSS-REFERENCE TO RELATED APPLICATION

This application is a continuation application of U.S. patent application Ser. No. 14/129,961, entitled MECHANISM FOR FACILITATING DYNAMIC CONTEXT-BASED ACCESS CONTROL OF RESOURCES, filed Dec. 28, 2013, by Ned Smith, et al., now pending, which is a U.S. National Phase Application under 35 U.S.C. § 371 of International Application No. PCT/US2013/062435, entitled MECHANISM FOR FACILITATING DYNAMIC CONTEXT-BASED ACCESS CONTROL OF RESOURCES, filed Sep. 27, 2013, by Ned Smith, et al., the benefit of and priority to which are claimed thereof and the entire contents of which are incorporated herein by reference.

FIELD

Embodiments described herein generally relate to computer programming. More particularly, embodiments relate to a mechanism for facilitating dynamic context-based access control of resources.

BACKGROUND

Existing access control management systems are built using access control policies that are based on operating system abstractions for user and/or computing device identity and permission, such as a user's identity may be expressed in terms of an operating system account name. Similarly, resources are identified using operating system abstractions for files and folders, and permissions are typically expressed as read, write, and execute privileges associated with the resources. Further, cloud-based services built on top of stand-alone operating systems have attempted to extend legacy access management systems into the cloud paradigm, but there has been a great deal of reluctance inputting highly sensitive content on cloud services due to the inability in specifying the context in which access is permitted, controlling the point at which access is enforced, etc.

Existing access control management systems and network security infrastructures are error-prone and inefficient as they are limited in performance and security for lacking customization features and intelligence.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for dynamic context-based management of control access of resources where multiple dimensions of client/user contexts may be collected prior to facilitating access to one or more resources. These multiple dimensions may include, but are not limited to, user identification and/or authentication, device identification and/or authentication, user presence monitoring, location of user and/or user's platform, presence of other individuals near or around user and/or user's device, etc. A resource may include a variety of items, such as any number and type of data, files, folders, information, devices, physical properties (e.g., business building, homes, etc.), etc. For example, seeking access to a resource may relate to a user seeking access to a file including relevant data or wanting permission to access an office building, etc. Embodiments further provide employing resource access decision and access points for evaluating the aforementioned contexts where such points may be at a single computing device serving as a host machine or distributed across a network (e.g., cloud network) at enterprise or other specific server computers or at location where a resource may be access, or a combination thereof. In one embodiment, decision and enforcement points may be extended to incorporate, for example, client context as a condition for accessing one or more resources.

Although one or more examples may be discussed throughout this document for brevity, clarity, and ease of understanding, it is contemplated that embodiments are not limited to any particular number and type of resources or forms of access to resources or devices or users, or the like. Similarly, embodiments are not limited to any particular network security infrastructures or protocols (e.g., single-sign-on infrastructures and protocols) and may be compatible with any number and type of network security infrastructures and protocols, such as security assertion markup language (SAML), OAuth, Kerberos, etc., to be extended and used with the novel context-based access capabilities.

Figure 1:
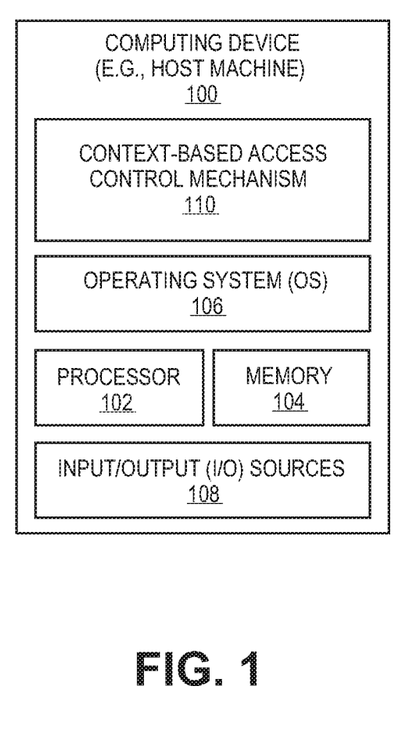
FIG. 1 illustrates a context-based access control mechanism employed at a computing device according to one embodiment.

FIG. 1 illustrates a context-based access control mechanism employed at a computing device according to one embodiment. Computing device 100 serves as a host machine for employing context-based access control mechanism ("access control mechanism") 110. Computing device 100 may include large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2:
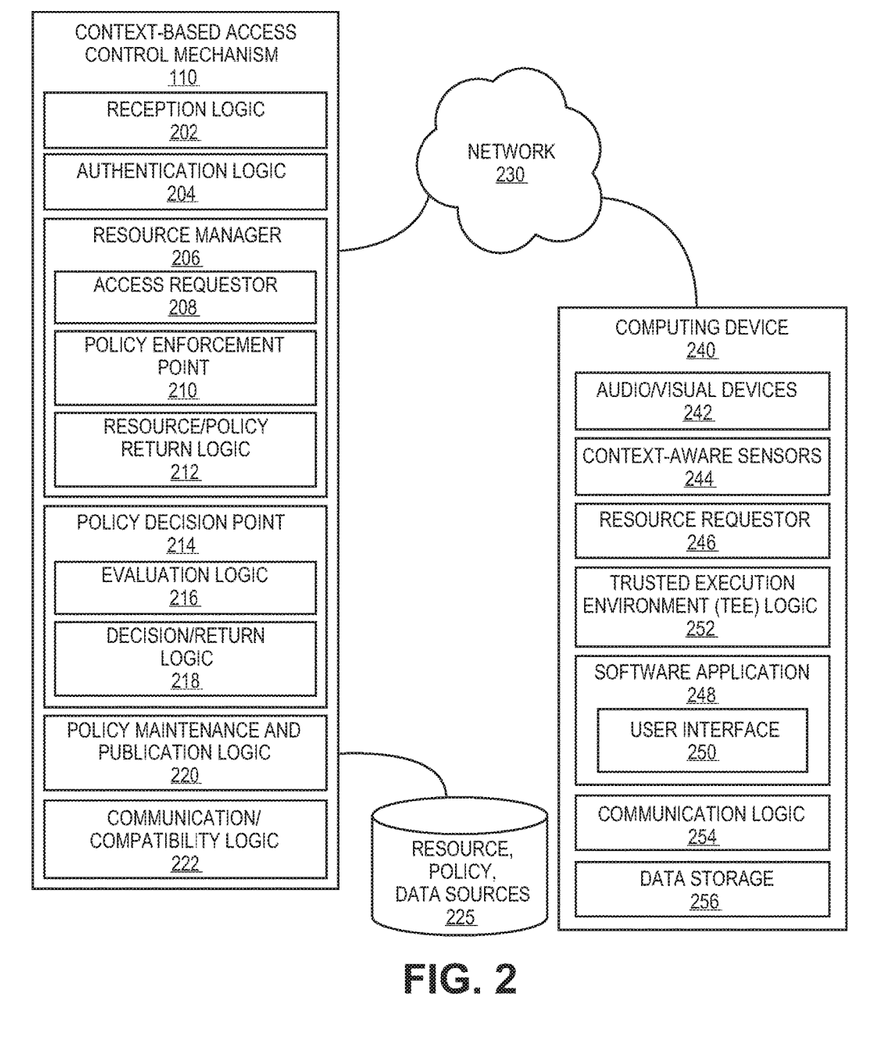
FIG. 2 illustrates a context-based access control mechanism according to one embodiment.

FIG. 2 illustrates a context-based access control mechanism 110 according to one embodiment. In one embodiment, context-based access control mechanism 110 may include a number of components, such as: reception logic 202; authentication logic 204; resource manager 206 including access requestor 208, policy enforcement point 210, and resource/policy return logic 212; policy decision point 214 including evaluation logic 216 and decision/return logic 218; policy maintenance and publication logic 220; and communication/compatibility logic 222. Access control mechanism 110 may be hosted at a host machine, such as computing device 100 of FIG. 1, and be in communication with one or more resource, policy, and data sources, such as resource, policy, and data sources ("data sources") 225, for maintaining any number and type of resources, policies, data, raw files, distributed file system and cloud storage, etc., and one or more computing devices, such as computing device 240 (e.g., client computing device, such as a mobile computing device including a smartphone, a tablet computer, a laptop computer, etc.), over one or more networks, such as network 230 (e.g., cloud network, the Internet, proximity network, such as Bluetooth, etc.). In some embodiments, access control mechanism 110 may be distributed across computing devices or nodes over one or more networks, such as network 230; for example, PDP 214 may be co-located with resource manager 206, as illustrated, or distributed across multiple computing nodes.

Computing device 240, in one embodiment, may include a client computing device remotely located and in communication with the host machine employing access control mechanism 110 over one or more networks, such as network 230. In some embodiments, computing device 240 may include or serve as an extension of a server/host computing device, such as computing device 100 of FIG. 1, having also employed other components, such as components 202-222, of access control mechanism 110. As illustrated, computing device 240 includes any number and type of components, such as audio/visual devices 242 (e.g., cameras, microphones, speakers, etc.), context-aware sensors 244 (such as temperature sensors, facial expression and feature measurement sensors working with one or more cameras of audio/visual devices 242, environment sensors (such as to sense background colors, lights, etc.), biometric sensors (such as to detect fingerprints, etc.), user calendar reader, etc.), resource requestor 246, trusted execution environment (TEE) logic 252, and communication logic 254. TEE logic 252 may be employed separately or be part of resource requestor 246 and/or an I/O subsystem, etc. Computing device 240 may also include one or more software applications, such as software application 248 (e.g., business application, website, etc.) offering one or more user interfaces, such as user interface 250 (e.g., web user interface (WUI), graphical user interface (GUI), touchscreen, etc.). Computing device 240 may further include one or more local storage mediums/devices and/or memory, such as local storage 256, for storing and caching data.

In one embodiment, access control mechanism 110 facilitates a context-based access management system to provide platform capability to issue policies based on on-demand context aware user and/or device credentials used for secure access of resources offered via data sources 225. For example, if a user of computing device 240 wishes to access a resource (e.g., look into a secure file for data, enter a secure office building, etc.), this request for accessing the resource may be communicated from resource requestor 246 to reception logic 202 via communication logic 254 and communication/compatibility logic 222, respectively. However, prior to communicating the request, in one embodiment, resource requestor 246 facilitates sensors 244 to collect and/or monitor context-aware data relating to the user, computing device 240, and/or one or more other users and/or computing devices.

The collection and/or monitoring of context-aware data may be performed continuously, periodically (e.g., upon reaching a predetermined time period), and/or upon detecting an event (e.g., user accessing a panel (e.g., computing device 240) near a door of a building to access the building), etc. In one embodiment, sensors 244 may include devices configured to sense various characteristics of users, devices, environment, and/or things, etc., relative to computing device 240. For example, in some embodiments, sensors 244 may include biometric sensors to sense physical attributes (e.g., fingerprints, facial features/measurements, speech patterns, retinal patterns, etc.) and/or behavioral characteristics (e.g., body movement, visual focus patterns, eye movement, speed and strength of key inputs, etc.) of users of computing device 240. For example, sensors 244 may work with and/or facilitate audio/visual devices 242 to detect and monitor some of the characteristics, such as using a camera to detect a user's facial features, such as distance between the user's eyes, etc., microphone to detect the user's voice patterns, etc. In some embodiments, such sensors 244 may be used to authenticate the user to computing device 240 and in some embodiments, such data collected by sensors 244 may be used by authentication logic 204 to authenticate the user and/or computing device 240 and/or other users accessing access control mechanism 110 via computing device 240.

Similarly, sensors 244 may include devices configured for proximity detection to detect, for example, the proximity of the user or a physical tag or token (e.g., a Bluetooth tag, a near field communication tag, a body area network (BAN) tag, a radio frequency identification tag, etc.) carried by the user in proximity of or interaction with computing device 240. Sensors 244, for example, may include other devices, such as one or more accelerometers for sensing the carrying and/or movements of computing device 240 by the user. It is contemplated that not all sensors and/or audio/visual devices may be part of or incorporated within computing device 240 and one or more sensors and/or audio/visual devices may be external to or separate from computing device 240.

In one embodiment, a user wanting access to a resource may place a request for accessing the resource with computing device 240 via user interface 250 provided through software application 248. The request is collected by resource requestor 246 on behalf of the user and communicated to reception logic 202 at access control mechanism 110 for processing. In one embodiment, resource requestor 246 may or may not have a prior knowledge of the number of type of contexts needed to satisfy the applicable access policy and/or challenge for the resource request to be granted. Further, resource requestor 246 may be used for supporting opt-in privacy semantics and enforce user privacy requirements by refusing to disclose contexts that may unnecessarily place the user at risk. Further, in one embodiment, resource requestor 246 may include multiple user devices and/or personal cloud services from which context data may be collected.

In one embodiment, computing device 240 may further include TEE logic 252 that may be implemented using one or more of Intel®'s Active Management Technology (AMT), Management Engine (ME), vPro™ technology, Core™ vPro™ technology, Identity Protection Technology (IPT) using Public Key Infrastructure (PKI), etc., and/or any other number and type of trusted computing device-related technologies, components, etc., from any number and type of other manufacturers.

Communication logic 254 may be similar to or the same as communication/compatibility logic 222 to facilitate communication between computing device 240 and access control mechanism 110 and any number and type of components and devices, such as a key distribution center server, a service provider server, and/or other computing devices. Further communications logic 222, 254 may be arranged or configured to use any one or more of communication technologies, such as wireless or wired communications and relevant protocols (e.g., Wi-Fi®, WiMAX, Ethernet, etc.), to facilitate communication. Data storage 256 and data sources 225 may include any number and type of devices or mediums for short-time or long-term storage of data, such as data storage devices, hard drives, solid-state drives, hard disks, memory cards or devices, memory circuits, etc., for storing and retaining data, policies, resources, software programs or instructions, etc.

Referring back to reception logic 202, upon receiving the request for accessing a resource, reception logic 202 forwards the request to authentication logic 204. As previously discussed, in some embodiments, the user and computing device 240 may be authenticated by authentication logic 204 and/or in other embodiments, the authentication process may be performed locally at computing device 240 via resource requestor 246 and/or other authentication components, etc. Upon successful authentication at authentication logic 204, the request may then be forwarded on to resource manager 206 for further processing.

As aforementioned, resource requestor 246 may or may not know the relevant context policy, such as what context may be necessary or minimally required for grant of access to one or more resources. In one embodiment, access requestor 208 may, upon receiving the request, contact policy decision point (PDP) 214 to further evaluate the request such that the context received with or within the request may be matched against the relevant policy for the requested resource to be accessed. At PDP 214, evaluation logic 216 evaluates the request which may include comparing the user/device contexts with one or more policies (e.g., policy P1) to determine with the request meets the minimum criteria of contexts to access the requested resource (e.g., resource R1). For example, evaluation logic 216 compares each context provided via the request with the minimum context requirement criteria as set forth in P1, which may have been published by policy maintenance and publication (PMP) logic 220. For example, evaluation logic 216 accesses the policy, P1, at a data source 225, via PMP logic 220 and upon performing the check of contexts, provides the evaluation results to decision/return logic 218.

In one embodiment, using the evaluation results, decision/return logic 218 decides whether the request be granted, such as whether the user be allowed access to the requested resource. If the request is approved by decision/return logic 218, the approval decision is returned by decision/return logic 218 to policy enforcement point (PEP) 210 for further processing. In contrast, if the request is rejected, by decision/return logic 218, for, for example, not meeting the minimum context criteria for the resource, R1, as set forth in the applicable policy, P1, the rejection decision along with a minimum policy (e.g., mP1) having a minimum context criteria for the resource, R1, is returned to PEP 210. PEP 210 may then enforce the decision, such as approval or rejection, by forwarding the decision on to resource/policy return logic 212 which, in one embodiment, may then prepare a decision package by consolidating the basic decision (such as approval or rejection) with the minimum policy (in case of the rejection) and adding to it any other details (e.g., recommendations relating to any substitute contexts, etc.). The decision package may then be communicated back to resource requestor 246, via communication/compatibility logic 222 and communication logic 254.

At resource requestor 246, the decision package is received, prepared (e.g., translated to human-readable format), and then communicated, in human-readable format, to the user via user interface 250 where the decision package is displayed via a display device/screen. It is contemplated that in case of the rejection, upon reviewing the decision package the user may decide to resubmit the request for the resource in attempts to meet the minimum policy criteria provided in the decision package. In case of a resubmission, the new request may again be received at resource requestor 246 and the entire process is repeated. In case of the approval, the user is granted access to the requested resource (e.g., facilitating access to a file via computing device 240, allowing physical entrance into a building upon having the door panel successfully authenticating/verifying the user, accepting the user's boarding pass being displayed a boarding pass reader at airport security via computing device 240 (e.g., mobile computing device, such as a smartphone), etc.).

For example, R1 refers to permission to enter a building and P1 being the corresponding policy that requires the user to provide their fingerprints and a facial feature, such as the distance between the user's eyes, for proper identification to enter the building. Now, if the user passes P1, the display screen of the building panel may display an acceptance message (e.g., "please enter", "approved to enter the building", "welcome, please enter", etc.) indicating to the user that they may enter the building. Now, for example, the user fails the facial feature part of the policy PI, the building panel's display screen may display the decision package including the rejection of the request along with an alternate minimum policy, such as mP1, for entrance. For example, mPI may provide a negotiated minimum policy to suggest that the user provide their fingerprints and another form of identification, such as a scan of the user's embedded smart-card (e.g., common access card (CAC), near field communication (NFC) tag, radio frequency identification (RFID) tag, etc.). At this point, upon reading the rejection message and the minimum policy, the use may choose to either walk away from the building or make another attempt to enter the building by trying to satisfy the alternate minimum policy, mP1.

In one embodiment, any number and type of policies corresponding to any number and type of resources may be maintained at data sources 225 and via PDP logic 220. For example, a policy may be generated by an administrative user (e.g., system administrator, computer programmer, etc.), stored at data sources 225, and automatically maintained and kept up-to-date via PDP logic 220. In some embodiments, one or more policies may be kept confidential and unknown, while in some embodiments, one or more policies may be published by PDP logic 220. It is contemplated that a publication may refer to a machine publication where a policy may be known to various components, such as PDP 214, resource requestor 246, etc., and/or a human publication where it may be made known to any number and type of users.

In one embodiment, on-demand access may be implemented where resource requestor 246 may acquire one or more of authentication, authorization, location, and other contexts as necessary. In other words, provisioning of context-aware access credentials may be performed on-demand rather than requiring pro-provisioning. For example, upon change of an existing one or more policies, contexts may be provisioned on-demand to maintain the user's access to one or more resources or subject the user to new policy to re-determine the user's access of the one or more resources. Further, having TEE technology facilitated by TEE logic 252 at client computing device 240 helps minimize opportunities for users and/or the client computing devices to lie about their context attributes and at the same time, prevents client malware from masquerading as the real client to capture any of the privacy sensitive identifiable information, whether it be within cloud or non-cloud services. In case of computing device 240 being a mobile device, certain mobile environments (such as TEE, secure element (SE), etc., may be employed used to make up for the security framework.

In one embodiment, resource protection may be logical (e.g., based on encrypted containers as opposed to physical repositories distributed from the point at which access decision may be made). Further, as aforementioned, access policies may be authored independently of resource manager 206 or physical location of the resource; for example, the policy may include a centrally-managed policy using a "policy vault" service, such as data sources 225. In one embodiment, PDP 214 and/or resource manager 206 may facilitate context collection assistance in the form of providing a "minimum policy" profile that facilitates or directs the context collection process. It is contemplated that there may be multiple profiles that define a minimum policy where the policy authoring entity has determined that, for example, profile A is roughly equal to profile B, etc. Further, part of trust negotiation may involve finding a close match of a profile that corresponds to the available sensors 244 and devices 242 and closely matches user preferences for those sensors 244 with which interactions are preferred. For example, a user may prefer voice recognition over facial recognition and in response, resource manager 206 may determine that face recognition and voice recognition are roughly equivalent for authentication purposes and accordingly, voice recognition would be acceptable in lieu of facial recognition.

Further, for example, a form of automated trust negotiation may be employed to agree upon a minimum policy, but may not require a prior disclosure or privacy-sensitive contexts to initiate the policy negotiation. Further, in one embodiment, resources, policies, context-aware data, etc., may be physically distributed over network 230 using one or more data sources 225. Similarly, access control mechanism 110 may be hosted at a single server computing device, such as host machine 100 of FIG. 1, or distributed over multiple computing devices (e.g., sever computers, client computers, etc.) over one or more networks, such as network 230, such as, for example, resource management components, such as resource manager 206, access control decision-making components, such as PDP 214, policy repositories and resource storages, such as data sources 225, etc., may be implemented as separate services at separate computing nodes that may nevertheless follow a consistent and coherent context-based access control policy.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "Identity Protection Technology", "IPT", "Core™", "vPro™", "trusted execution environment, "TEE", "policy decision point", "PDP", "policy enforcement point", "PEP", "resource manager", "resource requestor", "R1", "P1", "mP1", etc., should not be read to limit embodiments to software or devices that carry that label in products or in literature external to this document.

Communication/compatibility logic 222 may be used to facilitate dynamic communication and compatibility between various computing devices, such as host machine 100 of FIG. 1, and computing device 240 (e.g., client computing device, such as a mobile computing device, a desktop computer, etc.), storage devices, databases and/or data sources, such as data source 225, networks, such as network 230 (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), etc.), connectivity and location management techniques (e.g., Common Connectivity Framework (CCF) by Intel®, etc.), software applications/websites, (e.g., social networking websites, such as Facebook®, LinkedIn®, Google+®, etc., business applications, games and other entertainment applications, etc.), programming languages, etc., while ensuring compatibility with changing technologies, parameters, protocols, standards, etc.

It is contemplated that any number and type of components may be added to and/or removed from access control mechanism 110 to facilitate various embodiments including adding, removing, and/or enhancing certain features. For brevity, clarity, and ease of understanding of access control mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
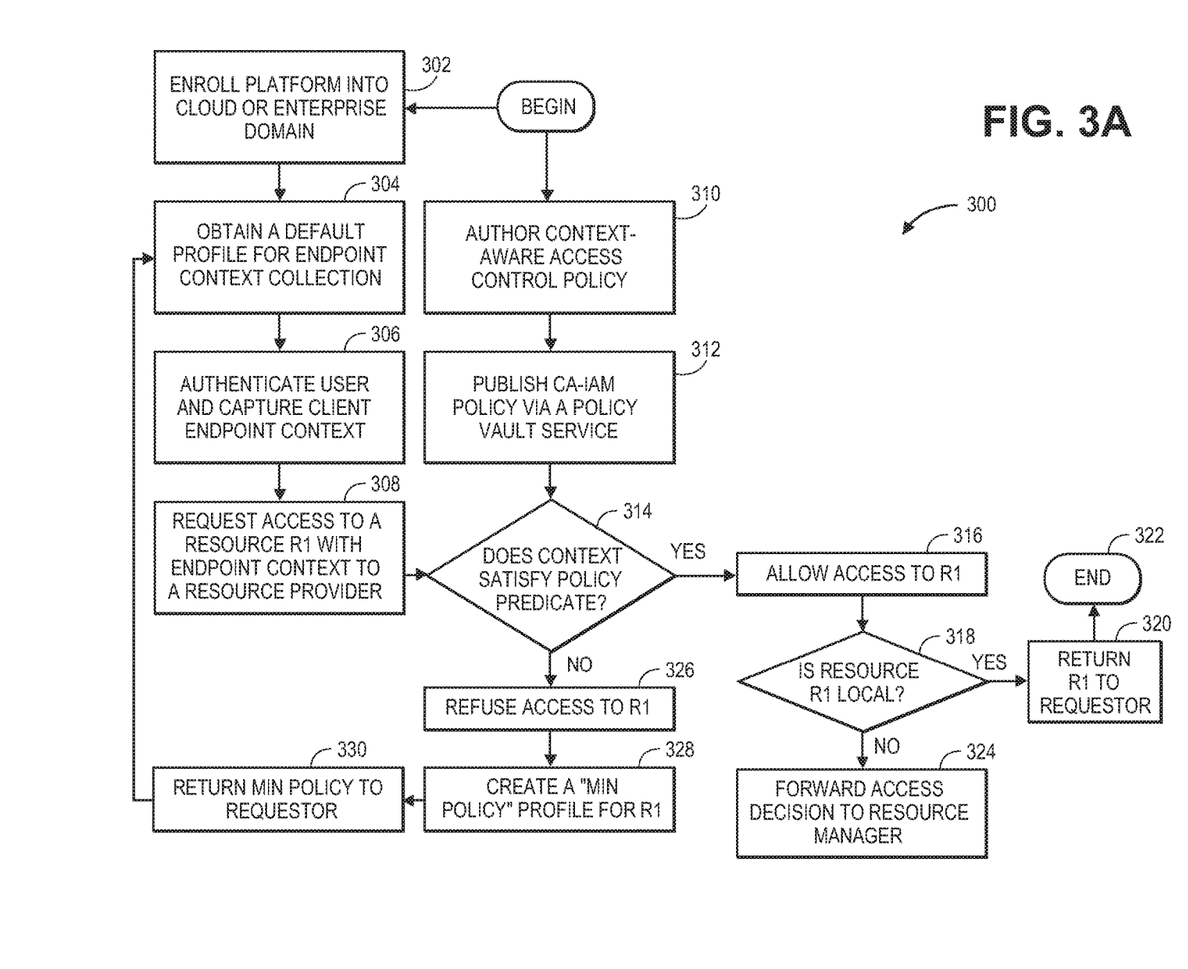
FIG. 3A illustrates a method for facilitating context-based control of resource accesses according to one embodiment.

FIG. 3A illustrates a method 300 for facilitating context-based control of resource accesses according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by access control mechanism 110 of FIG. 1 and/or one or more components 242-256 of FIG. 2.

Method 300 begins at block 302 with enrolling a platform relating to a client computing device with a cloud or enterprise domain where, at block 304, a default profile of a user and that of the client computing device is obtained for endpoint context collection. At block 306, the user is authenticated and the relevant client endpoint contexts are captured. Method 300 may have a simultaneous or separate string where at block 310, context-aware access policies relating to accessing various resources may be authored by one or more administrative users and, at block 312, these policies (e.g., CA™ identity and access management (IAM) policy) may be published via a policy vault service.

Referring back to the first string, in one embodiment, at block 308, the user, at the client computing device, may request access to a resource (e.g., R1) with the endpoint context to a resource provider. At block 314, a determination is made as to whether the resource request satisfies a base policy. If the base policy is satisfied, at block 316, the user is allowed access to the requested resource. However, at block 318, another determination is made as to whether the requested resource is local or remote. If the resource is local, the resource is returned to the user, via the client computing device, at block 320 and the process ends at block 322. If the resource is remote or not local, at block 324, the request is routed back to a resource manager, such as resource manager 206 of FIG. 2, which then evaluates the request, locates the requested resource, and returns the returns the resource to the user at block 320. The process may then end at block 322.

Referring back to decision block 314, if the base policy is not satisfied, the resource request or the access to the resource is refused at block 326. At block 328, a minimum policy is generated for accessing the resource. The minimum policy may be part of or alternate to the base policy. For example, if the base policy requires satisfying 3 contexts in order to access the resource, the minimum policy may require that 2 of the 3 contexts be satisfied, or a combination of 1 of the 3 context and another context or identification (e.g., password, driver's license, thumbprint, etc.), may be satisfied, or an entirely different policy of contexts (e.g., last three passwords, answers to challenge questions, etc.) may be offered to access the resource. This motivation for minimum-alternate policies, also referred to as "scoring", may be used by the policy authoring entity to establish combinations that are regarded as roughly equivalent. Further, for example, scoring may be used by process 308 to automate finding combinations of contextual inputs that are roughly equivalent to the minimum policy as a way for the client or user to find a most suitable combination of factors that may not have been anticipated by the resource manager. At block 330, the rejection and the minimum policy are returned to the user. The process may end if, for example, the user chooses not to pursue the minimum policy or continue at block 304.

Figure 3B:
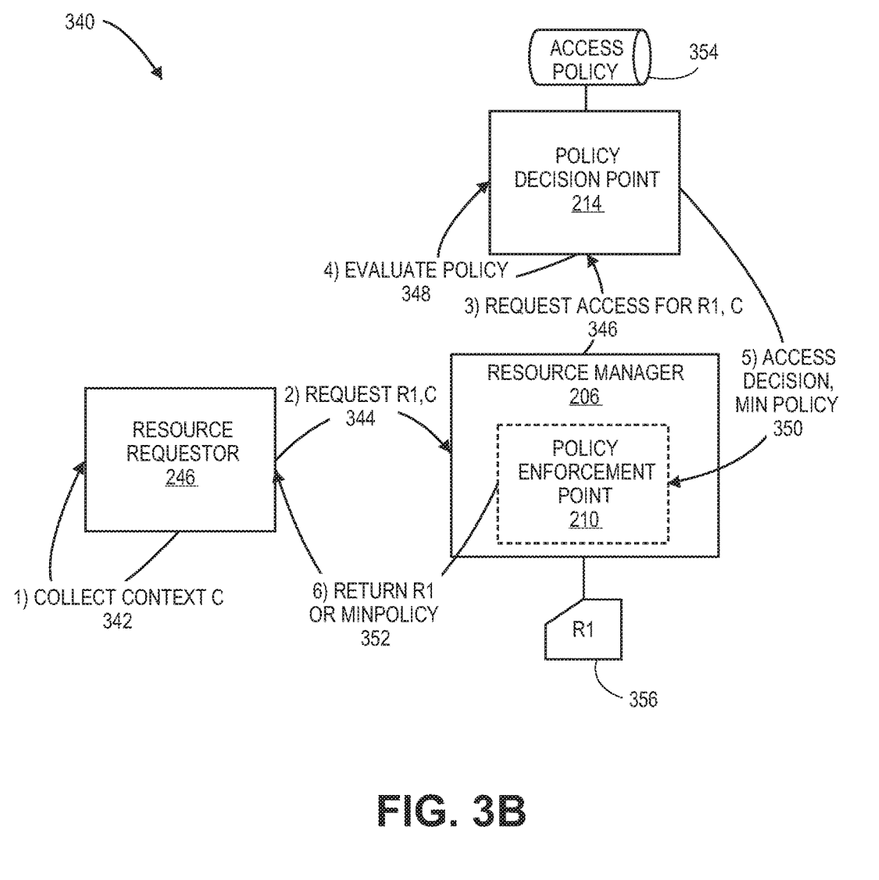
FIG. 3B illustrates a transaction sequence for facilitating context-based control of resource accesses according to one embodiment.

FIG. 3B illustrates a transaction sequence 340 for facilitating context-based control of resource accesses according to one embodiment. Transaction sequence 340 may be performed by processing logic that may comprise hardware (e.g., circuitry, dedicated logic, programmable logic, etc.), software (such as instructions run on a processing device), or a combination thereof. In one embodiment, transaction sequence 340 may be performed by access control mechanism 110 of FIG. 1 and/or one or more components 242-256 of FIG. 2.

In one embodiment, transaction sequence beings at with collection of contexts 342 by resource requestor 246 via one or more sensors and/or audio/visual devices at a client computing device. The user-placed request for accessing a resource 356 is received at resource requestor 246 and then communicated 344 on to resource manager 206. The resource request is then forwarded on 346 to PDP 214 where the resource request is evaluated 348 to determine whether the contexts provided with or within the request meet at least the corresponding base policy developed for the requested resource 356. The base policy may be accessed from, for example, a repository 354 which may be the same as or similar to data sources 225 of FIG. 2. A decision package (e.g., acceptance of the request, minimum policy along with rejection of the request, etc.) is generated at PDP 214 and forwarded on 350 to PEP 210. In one embodiment, in case of the acceptance of the request, the requested resource 356 is returned 352 to resource requestor 246 to be communicated on to the user. In another embodiment, in case of the rejection of the request, a minimum policy to re-request and re-qualify to access the resource 356 is returned 352 to resource requestor 246 to be communicated on to the user.

Figure 3C:
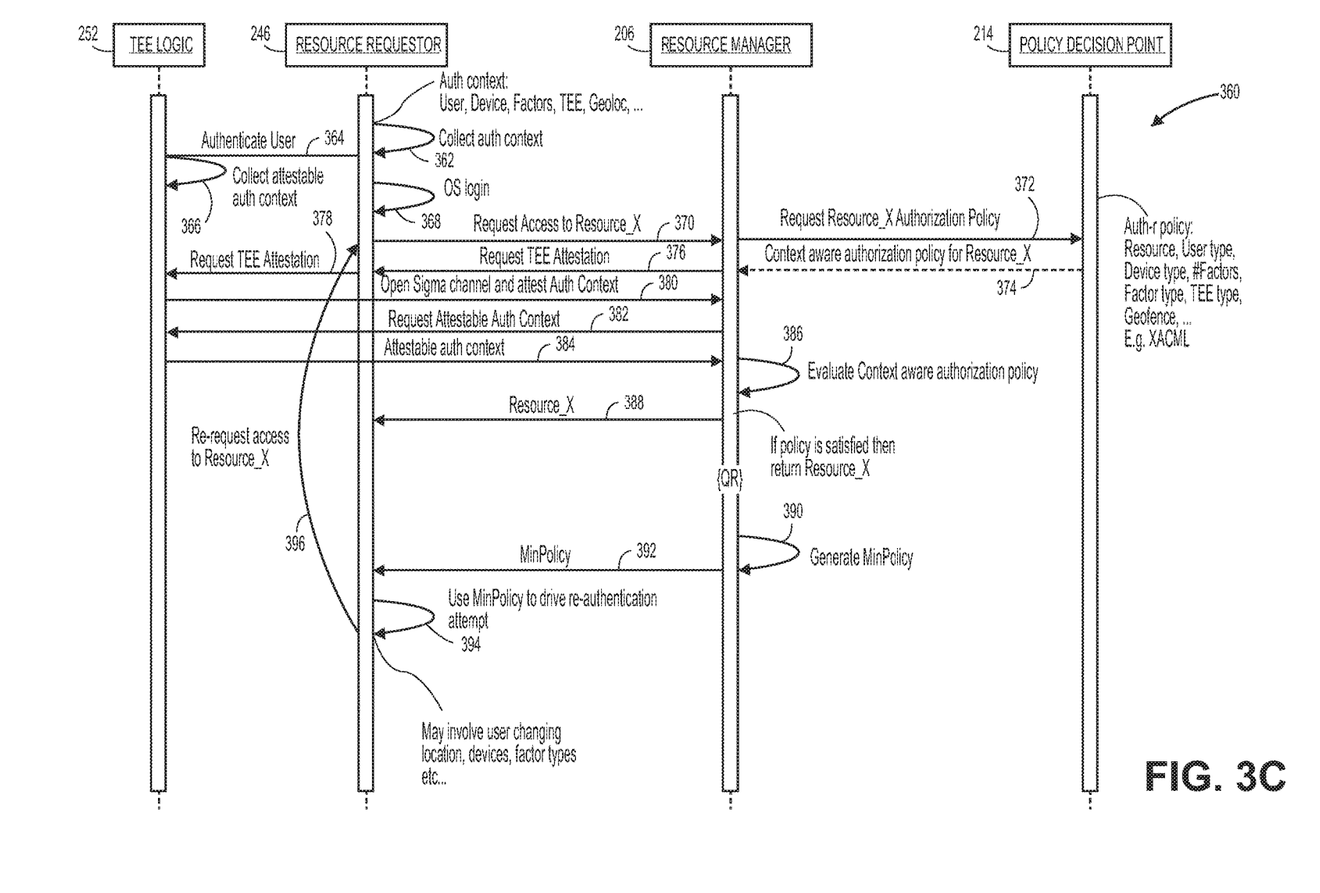
FIG. 3C illustrates a transaction sequence for facilitating context-based control of resource accesses according to one embodiment.

FIG. 3C illustrates a transaction sequence 360 for facilitating context-based control of resource accesses according to one embodiment. Transaction sequence 360 may be performed by processing logic that may comprise hardware (e.g., circuitry, dedicated logic, programmable logic, etc.), software (such as instructions run on a processing device), or a combination thereof. In one embodiment, transaction sequence 360 may be performed by access control mechanism 110 of FIG. 1 and/or one or more components 242-256 of FIG. 2.

In one embodiment, transaction sequence 360 begins with collection of contexts 362 at resource requestor 246 and user authentication 364 via TEE logic 252 at a client computing device. Additional authentication contexts are collected 366 via TEE logic 252, while OS login 368 is performed at resource requestor 246 and a user request for accessing a resource is communicated 370 to resource manager 206 at a server computing device. The resource request is then communicated 372 to PDP 214 where its contexts are to be matched with a base policy to determine whether the request is to be granted or denied. The context-aware authorization policy for the requested resource is communicated 374 between PDP 214 and resource manager 206, where a TEE attestation is requested 376, 378 from resource requestor 246 and subsequently from TEE logic 252. In one embodiment, sigma channel may be opened and authentication context may be attested 380 by TEE logic 252. Any attestable context is requested 382 by resource manager 206 and provided 384 to it by TEE logic 252.

In one embodiment, a base policy relating to the requested resource is evaluated 386 in light of the context provide through the resource request, and if the policy is satisfied, resource manager 206 extends the requested resource and/or access to the requested resource 388 to resource requestor 246. In some embodiments, if the policy is not satisfied, an alternate minimum policy is generated 390 at resource manager 206 and communicated 392 to resource requestor 246. The minimum policy may then be used to trigger another request for the resource 394 which may then lead to the user re-requesting access to the resource 396 under the minimum policy.

Figure 4:
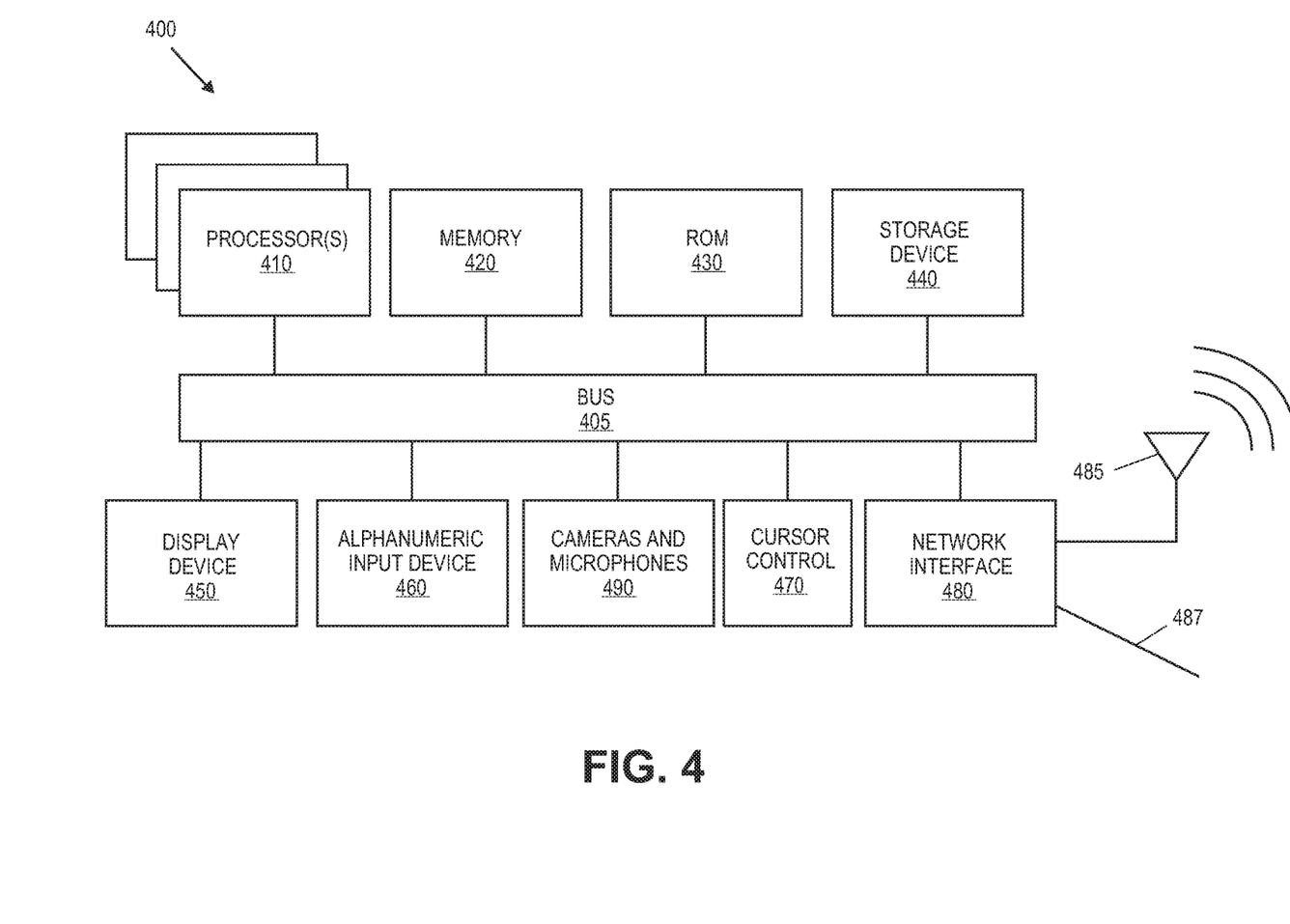
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100 of FIG. 1 and/or client computing device 240 of FIG. 2.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: receiving a first request to access a resource of a plurality of resources, wherein the first request is associated with one or more contexts corresponding to a user placing the first request at a computing device; evaluating the one or more contexts, wherein evaluation of the one or more contexts includes matching the one or more contexts with one or more access policies associated with the requested resource; and accepting the first request if the one or more contexts satisfy at least one of the one or more access policies.

Embodiments or examples include any of the above methods wherein accepting the first request comprises providing access to the requested resource, wherein accessing the requested resource comprises accessing one or more of data, computing devices, and physical properties.

Embodiments or examples include any of the above methods further comprising rejecting the first request if the one or more contexts fail to satisfy at least one of the one or more access policies, wherein rejecting the first request comprises denying access to the requested resource and generating a minimum access policy, the minimum access policy having a minimum access criteria to access the requested resource.

Embodiments or examples include any of the above methods further comprising communicating the minimum access policy to the user via the computing device for facilitating a second request to access the resource of the plurality of resources.

Embodiments or examples include any of the above methods further comprising: authenticating one or more of the request, the user, and the computing device, wherein the request is received over a network including a cloud network; and maintaining the one or more access policies associated with the plurality of resources.

Some embodiments pertain to a method comprising: collecting one or more contexts relating to a user; authenticating the one or more contexts; receiving a first request for accessing a resource of a plurality of resources, wherein the request is placed by the user, wherein the first request is submitted for retrieval of the requested resource; and associating the authenticated contexts to the first request for facilitating satisfaction of one or more access policies associated with the requested resource.

Embodiments or examples include any of the above methods further comprising receiving a decision package indicating acceptance or rejection of the first request, wherein access to the requested resource is granted if the first request is accepted, and wherein the first request is accepted if the authenticated contexts satisfy at least one of the one or more access policies associated with the plurality of resources.

Embodiments or examples include any of the above methods wherein the decision package further includes a minimum access policy if the first request is rejected, wherein the first request is rejected if the authenticated contexts fail to satisfy at least one of the one or more access policies, and wherein the rejection of the first request automatically triggers a second request to access the resource based on the minimum access policy.

Another embodiment or example includes an apparatus to carry out operations according to any of the methods mentioned above.

In another embodiment or example, an apparatus comprises means for carrying out operations according to any of the methods mentioned above.

In yet another embodiment or example, a computing device arranged to carry out operations according to any of the methods mentioned above.

In yet another embodiment or example, a communications device arranged to carry out operations according to any of the methods mentioned above.

In one embodiment or example, a system comprises a mechanism to carry out operations according to any of the methods mentioned above.

In yet another embodiment or example, at least one machine-readable storage medium comprising a plurality of instructions that in response to being executed on a computing device, causes the computing device to carry out operations according to any of the methods mentioned above.

In yet another embodiment or example, at least one non-transitory or tangible machine-readable storage medium comprising a plurality of instructions that in response to being executed on a computing device, causes the computing device to carry out operations according to any of the methods mentioned above.

Some embodiments pertain to an apparatus comprising: reception logic to receive a first request to access a resource of a plurality of resources, wherein the reception logic is further to receive one or more contexts associated with a user placing the first request at a computing device; evaluation logic of a policy decision point to evaluate the one or more contexts, wherein evaluation of the one or more contexts includes matching the one or more contexts with one or more access policies associated with the requested resource; and decision/return logic of the policy decision point to accept the first request if the one or more contexts satisfy at least one of the one or more access policies.

Embodiments or examples include the above apparatus wherein accepting the first request comprises providing access to the requested resource, wherein the acceptance is enforced via a policy enforcement point of a resource manager, and wherein the access to the requested resource is facilitated via resource/policy return logic of the resource manager, wherein accessing the requested resource comprises accessing one or more of data, computing devices, and physical properties.

Embodiments or examples include the above apparatus wherein the decision/return logic is further to reject the first request if the one or more contexts fail to satisfy at least one of the one or more access policies, wherein rejecting the first request comprises denying access to the requested resource, wherein the rejection is enforced via the policy enforcement point, wherein the decision/return logic is further to generate, if the first request is rejected, a minimum access policy having a minimum access criteria to access the requested resource.

Embodiments or examples include the above apparatus wherein the resource/policy return logic to communicate, via communication/compatibility logic, the minimum access policy to the user via the computing device to facilitate a second request to access the resource of the plurality of resources.

Embodiments or examples include the above apparatus further comprising: authentication logic to authenticate one or more of the request, the user, and the computing device, wherein the request is received over a network including a cloud network; and policy maintenance and publication logic to maintain the one or more access policies associated with the plurality of resources.

Some embodiments pertain to an apparatus comprising: one or more context-aware sensors to collect one or more contexts relating to a user, wherein the one or more contexts are further collected via one or more audio/visual devices; trusted execution environment logic to authenticate the one or more contexts; and resource requestor to receive a first request for accessing a resource of a plurality of resources, wherein the request is placed by the user, wherein the resource requestor is further to submit, via communication logic, the first request for retrieval of the requested resource, wherein the resource requestor is further to associate the authenticated one or more contexts to the first request to facilitate satisfaction of one or more access policies associated with the requested resource.

Embodiments or examples include the above apparatus wherein the resource requestor is further to receive a decision package indicating acceptance or rejection of the first request, wherein access to the requested resource is granted if the first request is accepted, and wherein the first request is accepted if the authenticated contexts satisfy at least one or more of the access policies associated with the plurality of resources.

Embodiments or examples include the above apparatus wherein the decision package further includes a minimum access policy if the first request is rejected, wherein the first request is rejected if the authenticated contexts fail to satisfy at least one or more of the access policies, and wherein, if the first request is rejected, the resource requestor to automatically trigger a second request to access the resource based on the minimum access policy.

Some embodiments pertain to a system comprising: a storage device having instructions, and a processor to execute the instructions to facilitate one or more operations comprising: receiving a first request to access a resource of a plurality of resources, wherein the first request is associated with one or more contexts corresponding to a user placing the first request at a computing device; evaluating the one or more contexts, wherein evaluation of the one or more contexts includes matching the one or more contexts with an access policy associated with the requested resource; and accepting the first request if the one or more contexts satisfy the access policy.

Embodiments or examples include the above system wherein accepting the first request comprises providing access to the requested resource, wherein accessing the requested resource comprises accessing one or more of data, computing devices, and physical properties.

Embodiments or examples include the above system wherein the one or more operations comprise rejecting the first request if the one or more contexts fail to satisfy the access policy, wherein rejecting the first request comprises denying access to the requested resource and generating a minimum access policy, the minimum access policy having a minimum access criteria to access the requested resource.

Embodiments or examples include the above system wherein the one or more operations comprise communicating the minimum access policy to the user via the computing device for facilitating a second request to access the resource of the plurality of resources.

Embodiments or examples include the above system wherein the one or more operations comprise: authenticating one or more of the request, the user, and the computing device, wherein the request is received over a network including a cloud network; and maintaining a plurality of policies associated with the plurality of resources, wherein the plurality of access policies include the access policy associated with the requested resource.

Some embodiments pertain to a system comprising: a storage device having instructions, and a processor to execute the instructions to facilitate one or more operations comprising: collecting contexts relating to a user; authenticating the contexts; receiving a first request for accessing a resource of a plurality of resources, wherein the request is placed by the user, wherein the first request is submitted for retrieval of the requested resource; and associating the authenticated contexts to the first request for facilitating satisfaction of an access policy associated with the requested resource.

Embodiments or examples include the above system wherein the one or more operations comprise receiving a decision package indicating acceptance or rejection of the first request, wherein access to the requested resource is granted if the first request is accepted, and wherein the first request is accepted if the authenticated contexts satisfy the access policy of a plurality of access policies associated with the plurality of resources.

Embodiments or examples include the above system wherein the decision package further includes a minimum access policy if the first request is rejected, wherein the first request is rejected if the authenticated contexts fail to satisfy the access policy, and wherein the rejection of the first request automatically triggers a second request to access the resource based on the minimum access policy.

Some embodiments pertain to an apparatus comprising: means for receiving a first request to access a resource of a plurality of resources, wherein the first request is associated with one or more contexts corresponding to a user placing the first request at a computing device; means for evaluating the one or more contexts, wherein evaluation of the one or more contexts includes matching the one or more contexts with an access policy associated with the requested resource; and means for accepting the first request if the one or more contexts satisfy the access policy.

Embodiments or examples include the above apparatus wherein accepting the first request comprises providing access to the requested resource, wherein accessing the requested resource comprises accessing one or more of data, computing devices, and physical properties.

Embodiments or examples include the above apparatus further comprising means for rejecting the first request if the one or more contexts fail to satisfy the access policy, wherein rejecting the first request comprises denying access to the requested resource and generating a minimum access policy, the minimum access policy having a minimum access criteria to access the requested resource.

Embodiments or examples include the above apparatus further comprising means for communicating the minimum access policy to the user via the computing device for facilitating a second request to access the resource of the plurality of resources.

Embodiments or examples include the above apparatus further comprising: means for authenticating one or more of the request, the user, and the computing device, wherein the request is received over a network including a cloud network; and means for maintaining a plurality of policies associated with the plurality of resources, wherein the plurality of access policies include the access policy associated with the requested resource.

Some embodiments pertain to an apparatus comprising: means for collecting contexts relating to a user; means for authenticating the contexts; means for receiving a first request for accessing a resource of a plurality of resources, wherein the request is placed by the user, wherein the first request is submitted for retrieval of the requested resource; and means for associating the authenticated contexts to the first request for facilitating satisfaction of an access policy associated with the requested resource.

Embodiments or examples include the above apparatus further comprising means for receiving a decision package indicating acceptance or rejection of the first request, wherein access to the requested resource is granted if the first request is accepted, and wherein the first request is accepted if the authenticated contexts satisfy the access policy of a plurality of access policies associated with the plurality of resources.

Embodiments or examples include the above apparatus wherein the decision package further includes a minimum access policy if the first request is rejected, wherein the first request is rejected if the authenticated contexts fail to satisfy the access policy, and wherein the rejection of the first request automatically triggers a second request to access the resource based on the minimum access policy.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus to facilitate context-based access control, comprising:
a hardware memory,
a reception logic coupled to the hardware memory, wherein the reception logic is configured to receive over a network a first request including one or more first contexts to access a resource of a plurality of resources from a computing device, wherein context information related to the one or more first contexts associated with a user is collected using sensors at the computing device;
an authentication logic to authenticate the user using the one or more first contexts of the first request after the one or more first contexts have been authenticated;
an evaluation logic of a policy decision point to evaluate the one or more first contexts, wherein evaluation of the one or more first contexts includes attempting to match the one or more first contexts with a first access policy associated with the requested resource; and
a decision/return logic of the policy decision point to accept the first request if the one or more first contexts satisfy the first access policy, wherein the decision/return logic is to reject the first request if the one or more first contexts fail to satisfy the first access policy and to generate a second access policy having one or more second contexts criteria to access the requested resource, wherein the reception logic is configured to receive a second request including the one or more second contexts to access the requested resource based on the second access policy, wherein the authentication logic is configured to authenticate the contexts and the user using the one or more second contexts that are different from the one or more first contexts, and wherein the rejection of the first request automatically triggers the second request to access the requested resource based on the second access policy.

2. The apparatus of claim 1, wherein accepting the first request comprises providing access to the requested resource, wherein the acceptance is enforced via a policy enforcement point of a resource manager, and wherein the access to the requested resource is facilitated via resource/policy return logic of the resource manager, wherein accessing the requested resource comprises accessing one or more of data, computing devices, and physical properties.

3. The apparatus of claim 1, wherein rejecting the first request comprises denying access to the requested resource, wherein the rejection is enforced via the policy enforcement point,
wherein the one or more second contexts criteria are a minimum access criteria to access the requested resource.

4. The apparatus of claim 1, further comprising:
a policy maintenance and publication logic to maintain one or more policies associated with the plurality of resources, and wherein the network includes a cloud network.

5. An apparatus to facilitate context-based access control, comprising:
one or more context-aware sensors to collect context information relating to one or more first contexts associated with a user, wherein the context information is collected via one or more audio/visual devices;
a hardware memory;
a trusted execution environment logic coupled to the hardware memory, wherein the trusted execution environment logic is configured to authenticate the user using the one or more first contexts after the one or more first contexts have been authenticated; and a resource requestor to transmit over a network a first request including the one or more first contexts to authenticate the user for accessing a resource of a plurality of resources, wherein the resource requestor is to transmit the first request via a communication logic, wherein the resource requestor is to include the one or more first contexts into the first request to facilitate satisfaction of a first access policy associated with the requested resource, wherein the resource requestor is to receive a decision package indicating a rejection of the first request and including a second access policy having one or more second contexts criteriato access the requested resource, if the one or more first contexts do not satisfy the first access policy, wherein the resource requestor is configured to transmit a second request including the one or more second contexts to access the requested resource based on the second access policy, if the first request is rejected, wherein trusted execution environment logic is configured to authenticate the contexts and the user using the one or more second contexts that are different from the one or more first contexts, and wherein the rejection of the first request automatically triggers the second request to access the requested resource based on the second access policy.

6. The apparatus of claim 5, wherein the resource requestor s further to receive a decision package indicating acceptance of the first request, wherein access to the requested resource is granted if the first request is accepted, and wherein the first request is accepted if the one or more authenticated first contexts satisfy the first access policy.

7. A method for facilitating context-based access control, comprising:
receiving over a network a first request including one or more first contexts to access a resource of a plurality of resources from a computing device, wherein context information related to one or more first contexts corresponding to a user is collected using sensors at a computing device;
authenticating the user using the one or more first contexts of the first request after the one or more first contexts have been authenticated;
evaluating the one or more first contexts, wherein evaluation of the one or more first contexts includes attempting to match the one or more first contexts with a first access policy associated with the requested resource; accepting the first request if the one or more first contexts satisfy the first access policy, wherein the first request is rejected if the one or more first contexts fail to satisfy the first access policy and wherein a second access policy having one or more second contexts criteria is generated to access the requested resource, and
receiving a second request including the one or more second contexts to access the requested resource based on the second access policy, if the first request is rejected, wherein the contexts and the user is authenticated using the one or more second contexts that are different from the one or more first contexts, and wherein the rejection of the first request automatically triggers the second request to access the requested resource based on the second access policy.

8. The method of claim 7, wherein accepting the first request comprises providing access to the requested resource.

9. The method of claim 7, wherein rejecting the first request comprises denying access to the requested resource and wherein the one or more second context criteria are a minimum access criteria to access the requested resource.

10. The method of claim 9, further comprising communicating the second access policy to the user via the computing device for facilitating the second request to access the resource of the plurality of resources.

11. The method of claim 9, further comprising:
maintaining the one or more access policies associated with the plurality of resources, wherein the network includes a cloud network.

12. A method for facilitating context-based access control, comprising
receiving a user request for accessing a resource of a plurality of resources;
collecting context information related to one or more first contexts associated with the user using one or more sensors;
authenticating the user using the one or more first contexts after the one or more first contexts have been authenticated;
transmitting a first request including the one or more first contexts to authenticate the user over a network, wherein the first request is transmitted for retrieval of the requested resource; and wherein the authenticated one or more first contexts are included into the first request for facilitating satisfaction of a first access policy associated with the requested resource, wherein the first request is rejected if the one or more first contexts fail to satisfy the first access policy and wherein a second access policy having one or more second contexts criteria is received to access the requested resource; and
transmitting a second request including one or more second contexts to authenticate the contexts and the user to access the resource based on the second access policy, if the first request is rejected, wherein the user is authenticated using the one or more second contexts that are different from the one or more first contexts, and wherein the rejection of the first request automatically triggers the second request to access the requested resource based on the second access policy.

13. The method of claim 12, further comprising receiving a decision package indicating acceptance or rejection of the first request, wherein access to the requested resource is granted if the first request is accepted, and wherein the first request is accepted if the authenticated one or more first contexts satisfy the first access policy associated with the plurality of resources.

14. The method of claim 13, wherein the decision package further includes the second access policy if the first request is rejected.

* * * * *